US006236900B1

(12) United States Patent
Geiger

(10) Patent No.: US 6,236,900 B1
(45) Date of Patent: May 22, 2001

(54) METHOD AND SYSTEM FOR INTERNET-BASED, COMPETITIVE EVENT PREDICTION

(76) Inventor: Michael P. Geiger, 3630 Lupine Ave., Palo Alto, CA (US) 94303

(*) Notice: Subject to any disclaimer, the term of this patent is extended or adjusted under 35 U.S.C. 154(b) by 0 days.

(21) Appl. No.: 09/303,873

(22) Filed: May 3, 1999

(51) Int. Cl.[7] .................................................. G06F 155/00

(52) U.S. Cl. ................................ 700/91; 463/16; 463/21; 463/25; 463/42

(58) Field of Search .................................... 273/246, 247, 273/259, 277, 273, 274; 463/4, 9, 16, 17, 18, 19, 20, 21, 25, 42; 700/91, 92

(56) References Cited

U.S. PATENT DOCUMENTS

| | | | | |
|---|---|---|---|---|
| 4,199,147 | * | 4/1980 | Stansberry | 273/246 |
| 4,722,526 | * | 2/1988 | Tovar et al. | 463/9 |
| 4,882,473 | * | 11/1989 | Bergeron et al. | 235/380 |
| 5,108,115 | * | 4/1992 | Berman et al. | 463/9 |
| 5,205,555 | * | 4/1993 | Hamano | 273/143 R |
| 5,263,723 | * | 11/1993 | Pearson et al. | 463/4 |
| 5,280,426 | * | 1/1994 | Edmonds | 364/408 |
| 5,586,937 | * | 12/1996 | Menashe | 463/21 |
| 5,722,890 | * | 3/1998 | Libby et al. | 463/17 |
| 5,738,583 | * | 4/1998 | Comas et al. | 463/40 |
| 5,743,525 | * | 4/1998 | Haddad | 273/139 |
| 5,749,785 | * | 5/1998 | Rossides | 463/25 |
| 5,860,862 | * | 1/1999 | Junkin | 463/1 |
| 5,871,398 | * | 2/1999 | Schneier et al. | 463/16 |
| 5,888,136 | * | 3/1999 | Herbert | 463/22 |
| 6,012,984 | * | 1/2000 | Roseman | 463/42 |
| 6,015,345 | * | 1/2000 | Kail | 463/16 |
| 6,024,641 | * | 2/2000 | Sarno | 463/17 |

OTHER PUBLICATIONS

Internet Casinos—"From Obscurity To The Worlds Largest Casino using The Internet", Feb. 1996.*
Network World—"Taking a Gramble on the Net", Apr. 1995.*
Time—"Betting on Virtual Vegas", Jun. 1995.*
Computerworld—"Dialing for digital Dollars", May 1996.*
Wall Street Journal, Aug. 1995.*
International Sports Wagering, Inc., Mar. 1998.*

* cited by examiner

*Primary Examiner*—Jeanette Chapman
*Assistant Examiner*—Dolores R. Collins
(74) *Attorney, Agent, or Firm*—Robert W. Bergstrom

(57) ABSTRACT

A method and system for providing an Internet-based competitive speculation forum in which participants can submit predictions of future events, obtain rewards for correct predictions and suffer penalties for incorrect predictions. Each competitive speculation forum is defined by a number of future events, such as sporting contests, elections and election debates, and stock price fluctuations. Participants may submit straight predictions, each based on a single future event, combination predictions, each based on a set of future events, and aggregation predictions, each based on a single future event and automatically resubmitted at fixed intervals. When an event occurs, points are awarded or subtracted from a participant's point holdings based on the length of time between the prediction and the occurrence of the event or events on which the prediction is based, the degree to which the occurrence of the event exceeds or falls short of an expected outcome, the reciprocal probability of the occurrence of the event, and a participant's confidence, measured in points, in the prediction.

7 Claims, 2 Drawing Sheets

METHOD AND SYSTEM FOR INTERNET-BASED, COMPETITIVE EVENT PREDICTION

TECHNICAL FIELD

The present invention relates to interactive data exchange and gaming systems in which remote users participate via electronic communications media, and, in particular, to a method and system for remote users to make and monitor predictions from various future events.

BACKGROUND OF THE INVENTION

During the past decade, the remarkable increase in the number and capabilities of personal computers ("PC"), combined with the growth and development of the Internet, has fueled the development and popular acceptance of a variety of different Internet-based forums that provide shared access and participation to communities of Internet users. These forums include web pages that can be downloaded and displayed concurrently by many different Internet users, Internet-based email systems that allow users to exchange email messages, chat rooms that provide a number of Internet users with the ability to exchange messages in real time, and a wide variety of different interactive, Internet-based gaming systems, such as fantasy football and computer-based versions of popular board and card games. A wide variety of Internet-based gambling systems are also currently available to Internet-users, including Internet-based casinos and sports waging systems. Many of the currently-available forums, including Internet-based gaming systems, are inherently constrained, or constrained for technical reasons, in the number of users that can concurrently participate in the game. For example, many popular interactive games are designed to accommodate between two and six players, such as Chess, Bridge, and various other computer-based implementations of traditional board and card games. As another example, real-time interactive systems, and even live Internet-based auction systems may be severely limited in the number of participants by interconnection bandwidth and server computer throughput. Many currently-available Internet-based gambling and wagering systems are of questionable legality, may have deleterious social effects, and are likely soon to be targets of legislative restrictions or prohibitions. However, wagering on future events have an almost universal appeal within human communities, and are likely to have continued and increasing appeal to communities of Internet users. Thus, a need has been recognized by Internet applications developers and service providers for an Internet-based forum that provides a legal, socially acceptable medium in which an unrestricted number of Internet-users can express a natural speculative and competitive interests in various types of future events.

SUMMARY OF THE INVENTION

The present invention provides a method and system for organizing the competitive speculation of a large number of remote participants with regard to one or more future events. In one embodiment of the present invention, a game master defines a new game, or forum, based on some set of related future events. Participants may then join the forum via a sign-up process. A participant may then log on to the forum and submit one or more predictions related to one or more of the future events that define the forum. A participant may submit a simple prediction related to a single future event, as well as complex predictions comprising a number of simple predictions. In addition, a user may submit an aggregate prediction that is automatically resubmitted, at some fixed interval, up until the future event to which the aggregate prediction is related occurs. When an event for which a participant has submitted predictions occurs, the participant is rewarded, in points, for accurate predictions and is penalized, in loss of points, for incorrect predictions. At the conclusion of a game or forum, participants with the largest point totals may be rewarded for their skill in predicting the outcomes of the events that define the forum in various ways, including Internet-based recognition, and prizes. Factors that contribute to the number of points added, for correct predictions, or removed for incorrect predictions, from a participant's point total as the result of the outcome of an event include: (1) the confidence of the participant in his or her prediction, expressed in a number of points; (2) the length of time between the prediction and the occurrence of the event; (3) the degree by which the outcome of the event exceeded or fell short of some predicted outcome; and (4) a predictive probability of the occurrence of the event.

DETAILED DESCRIPTION OF THE INVENTION

One embodiment of the present invention provides a method and system for a game master, or Internet entrepreneur, to define an interactive, Internet-based forum in which a potentially large number of remote Internet users can participate by predicting the outcomes of various future events. In a first subsection, a detailed description of the method of the present invention will be provided along with examples that illustrate the various types of predictions that participants can submit to the forum as well as the rewards that participants accrue as a result of correct predictions and the penalties that participants accrue as a result of incorrect predictions. In a second subsection, an SQL-like (Sequence Quarry Language) implementation of one embodiment of the present invention is provided.

Method of the Present Invention

Figure 1:
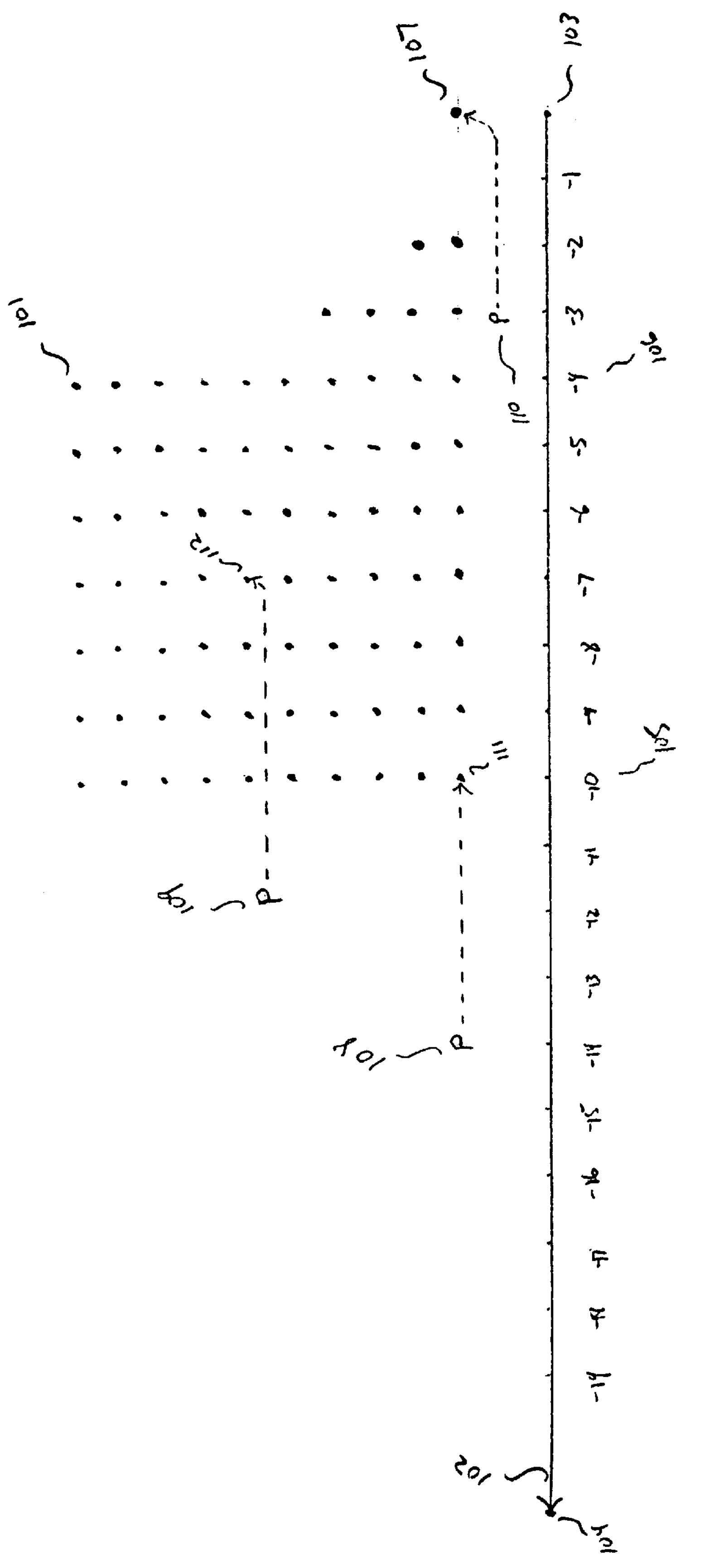
FIG. 1 shows a diagrammatic representation of a competitive speculation forum definition.

FIG. 1 shows a diagrammatic representation of a competitive speculation forum definition. Generally, a forum is defined as a set of future events. Future events are represented in FIG. 1 as filled disks, such as filled disk 101. The events are organized along a time line 102. Generally, the time line extends from a final time point 103 leftwards, or backwards, in time to a starting point 104 at which time the forum was set up and initialized. The intervals of the time line are assigned in view of the spacing in time of the defining events. For example, the events in FIG. 1 may be a series of football games played over the course of 11 weeks during a football season, with regular games occurring during the first 7 weeks, a quarter final game in the $8^{th}$ week, a semi-final game in the $8^{th}$ week, and a championship game in the $11_{th}$ week. The increments of the time line may then be weeks. Regular season occurs from ten weeks 105 to four weeks 106 prior to a final, championship game that occurs as the final event 107 at the final time point 103 of the forum. Participants in the forum may submit predictions 108–110 prior to the occurrence of particular events. As shown in FIG. 1, predictions 108–110 relate to the occurrences of events 111–112 and 107, respectively. The predictions 108–110 are also fixed in time with respect to the time line 102. Thus, for example, prediction 108 is shown in FIG. 1 as having occurred four weeks prior to the occurrence of event 111 and fourteen weeks prior to the championship game 107.

Many different types of common related events can be used as the basis of a forum, including a series of sporting events culminating in a championship game, as in FIG. 1, political elections, business-related events, including stock and options trading, and many other such common world events. If the events chosen to define a forum do not culminate in some final event, such as the events in FIG. 1, then an arbitrary ending point can be chosen as the end point of the forum. As will be discussed below, events may be added to the forum after initialization and start up of the forum but prior to the end point. Thus, the underlying model is quite flexible.

Figure 2:
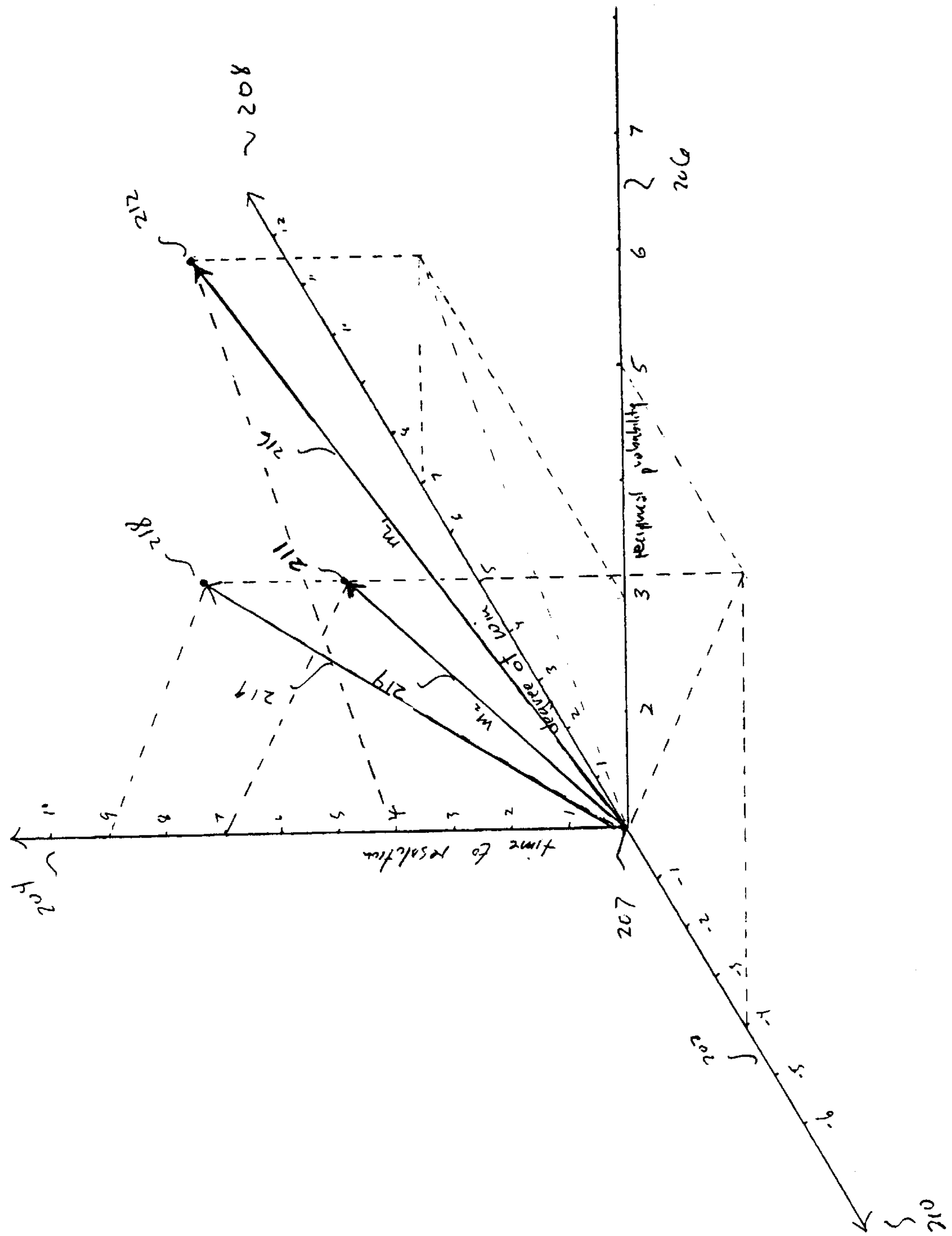
FIG. 2 graphically illustrates the parameters involved in computing point awards and point penalties.

Generally, the submission of a prediction, such as predictions 108–110 in FIG. 1, entitles a participant to receive an award of points, in the case that the prediction proves to be correct, and suffer a point penalty, in the case that the prediction proves to be incorrect. FIG. 2 graphically illustrates the parameters involved in computing point awards and point penalties. Three of these parameters correspond to the three orthogonal coordinate axes 202, 204, and 206 in FIG. 2. The "time to resolution" axis 204 starts from the origin 207 and extends vertically upward. The "time to resolution" axis corresponds to the time interval between a prediction and the outcome of the event to which the prediction is related. For example, for prediction 108 in FIG. 1, the time to resolution is four weeks. The "degree of win" axis 202 extends horizontally from the origin 207 in both positive and negative directions, therefore having a negative portion 210 and a positive portion 208. The degree of win for a prediction is either a positive value by which some measure of the result of an event exceeds a predicted value or a negative value by which the measure of the result of an event falls short of some predicted value. For example, if a participant predicts that Team A will win a football contest between Teams A and B, and it is estimated that Team A will beat Team B by five points, then if Team A beats Team B by ten points, the degree of win will be five points, or, in other words, the number of points in excess of the predicted five points by which Team A beats Team B. The "reciprocal probability" axis 207 starts from the origin 206 and extends horizontally in a positive direction. The reciprocal probability is the inverse of the estimated probability of the occurrence of an event. For example, a participant may predict that Team A will beat Team B in an upcoming football contest. In the case that the predicted probability that Team A will beat Team B, or the odds of Team A winning, is 1 to 10, then the reciprocal probability corresponding to the event "Team A wins" is ten. The three coordinate axes 202, 204, and 206 form two octants, a negative octant that includes the negative portion of the "degree of win" axis 210 and a positive octant that includes the positive portion of the "degree of win" axis 208. The resolution of a submitted prediction is represented in the vector space of FIG. 2 as a point in one of the two octants. For example, resolution 211 occurs in the negative octant at coordinates (−4, 5, 7) and resolution 212 occurs in the positive octant at coordinates (7, 3, 4). The resolutions can alternatively be thought of as vectors emanating from the origin 207 and extending to the resolution points, such as vectors "$m_2$" 214 corresponding to resolution 211 and "$m_1$" 216 corresponding to resolution 212. As the coordinates of a resolution increase along the axes in a direction away from the origin, the length of the corresponding vector increases. Thus, for example, if the prediction of the outcome represented in FIG. 2 as resolution 211 and vector 214 was made at 9 units of time prior to the resolution rather than seven units of time prior to the resolution, and thus had coordinates (−4, 5, 9), then the resolution would occur at point 218, rather than at point 211, and the vector 219 extending from the origin 207 to the resolution 218 would have a greater length than that of vector 214.

The score resulting at the resolution of an event for which a prediction p has been made is computed according to the following formula:

$$\text{outcome}_p=(\text{confidence}_p)\overline{m_p}$$

where $\text{confidence}_p$ is number of points risked by the participant upon submitting the prediction and $\overline{m_p}$ is the length of the vector extending from the origin 207 in FIG. 2 to the position of the resolution in the graph of FIG. 2 with respect to the three coordinate axes 202, 204, and 206. When the resolution falls in the negative octant of the graph of FIG. 2, the resulting score is a penalty, and has a negative value. When the resolution falls in the positive octant of FIG. 2, then the resulting score is a reward, and has a positive value.

The intervals by which the three coordinate axes 202, 204, and 206 are incremented may be chosen to produce a desirable result in the context of a particular forum. The intervals need not be linearly increasing, for example, and the units may vary from forum to forum. For example, in the forum represented in FIG. 1, the increments on the "time to resolution" axis may be weeks or days, and the increments on the "degree of win" axis may be in game points. For simplicity of calculation, rather than using the Euclidean lengths of the vectors extending from the origin 207 to a resolution, such as resolution 211, the product of the three coordinates of the resolution may instead be used according to the following formula:

$$\text{outcome}_p=\text{confidence}_p*\text{time to resolution}_p*\text{degree of win}_p*\text{reciprocal probability}_p$$

Many other score calculation formulas may be employed as well. Furthermore, the four components of the various scoring formulas, confidence, time to resolution, degree of win, and reciprocal probability, may be weighted and limited in order to produce desirable results. For example, if in the context of a particular forum the timeliness of predictions is deemed to be of greater importance than the other three parameters, then in the second formula, shown above, time to resolution may be multiplied by some weighting factor. As another example, maximum values may be set for any of the parameters so that extreme scores are not produced. Weighting of parameters corresponds, in FIG. 2, to adjusting the increments on the appointed axis corresponding to a weighted parameter with respect to the axes corresponding to the non-weighted parameters, and assigning maximum values to one or more parameters corresponds, in FIG. 2, in designating bound or partially bounded subspaces within the two octants as valid resolution domains.

The four parameters that contribute to the score produced by the resolution or occurrence, of an event for which a prediction has been submitted, are summarized below in Table 1:

TABLE 1

| Scoring Dimensions | |
|---|---|
| confidence | number of points that player wishes to risk on a particular prediction |
| reciprocal probability | proportional to the reciprocal of the probability that the predicted event will occur |
| degree of outcome | the degree or magnitude of a win or loss |
| time to resolution | the time between a player's prediction and the occurrence of an event that resolves the prediction |

A participant in the forum may submit a number of different types of predictions, or plays. In a current implementation of the present invention, three types of plays, or predictions, are allowed: (1) straight plays; (2) aggregation plays; and (3) combination plays. A straight play predicts the outcome of a single future event, such as the outcome of a football contest, the poll results following an election debate, or the price fluctuation of a stock or option. A straight play is completely resolved upon the occurrence of the event for which the straight play represents a prediction. The score that is obtained when the event occurs is calculated, as described above, with reference to FIG. 2. In different forums, different constraints may be applied to submission of straight plays. For example, a user may be allowed to make only a certain total number of straight plays, only some number of straight plays within any interval of time during operation of the forum, may risk only up to some maximum number of points when submitting any particular straight play, and other similar constraints or restrictions. Thus, a straight play may be thought of as a simple prediction.

In the described embodiment of the present invention, complex predictions, or combination plays, are also allowed. A combination play is essentially an ordered set of component straight plays. If all of the predictions represented by the component straight plays of a combination play prove to be correct, upon occurrence of the respective events, then the combination play has a positive outcome, or represents a win for the participant, and the score is computed as the product of the scores for the component straight plays. If all of the predictions corresponding to the sub-component straight plays or combination play prove, upon resolution, to be incorrect, then the combination play represents a loss for the participant, and the score or point penalty corresponding to the loss is computed as the product of the point penalties for each of the sub-component straight plays. In one implementation, when resolution of a combination play results in both correct and incorrect component plays, then the number of points representing the participant's confidence in the combination play, or points risked by the participant in submitting the combination play, are subtracted from the participant's point total. Because the resulting score from combination plays may be quite large, negative outcomes may be bounded by a maximum value, or may alternatively be computed on a basis other than the product of the outcomes of the component straight plays. As with straight plays, combination plays may be constrained in various ways, such as allowing a participant to risk only a limited amount of points on any particular combination play and submit only a limited number of total combination plays during operation of a forum and a limited number of combination plays for any particular fixed time interval during operation of the forum.

In the described embodiment of the present invention, the participant may submit an aggregation play. An aggregation play is essentially a recurring play. The participant submits the aggregation play at some point in time prior to resolution of events, and the aggregation play is then automatically replayed at fixed intervals during the time interval between initial submission of the aggregation play and resolution of the event predicted by the aggregation play. The number of points risked for each recurring submission of the aggregation play, including the initial submission, may be specified as some percentage of the total current point holdings of the participant. The initial submission of an aggregation play has score computation parameters equivalent to a straight play. However, the initial submission of an aggregation play fixes the "reciprocal probability" parameter for all subsequent submissions of the aggregation play to the "reciprocal probability" parameter of the initial submission of the aggregation play. Because the probability of a future event may change over the course of operation of a forum, a participant submitting an aggregation play may greatly benefit from an early submission predicting the occurrence of an event with a relatively large "reciprocal probability" parameter. For example, if the participant submits an aggregation play equivalent to predicting victory of a dark-horse candidate in an election-based forum, then should that candidate's campaign gain steam during the course of an election and finally result in victory, the participant who submitted the aggregation play will reap large point dividends as a result of a high fixed "reciprocal probability" parameter despite a continuously increasing probability of victory of the dark-horse candidate over time.

The three types of plays, discussed above, are summarized below in Table 2:

TABLE 2

| Types of Plays | |
|---|---|
| straight | a single prediction, at a discrete point in time, related to a future event |
| aggregation | a recurring prediction, starting at the discrete point in time and recurring at intervals, related to a future event |
| combination | an ordered set of straight plays combined together |

A new forum is started and initialized by a game master or other Internet entrepreneur, with respect to a defined set of future events. Commonly, the future events are related, as, for example, a series of professional sports contests that culminate in a championship game, an election process that culminates in the election of candidates for political office, or a process that results in the conferment of some kind of award or recognition, such as the Academy Awards. However, future events may be arbitrarily chosen to define a game forum. Once a game forum is in operation, potential participants may sign up through a sign-up process. Generally, the potential participant will successfully conclude the sign-up process by supplying verifiable and acceptable credit information or payment of an entry fee. Upon successful completion of the sign-up process, a new participant receives an initial allocation of points. As time progresses, the participant may increase or decrease the initial set of points by submission of predictions, or plays, that are successful or unsuccessful, respectively. During the course of operation of the forum, a game master or forum manager may add or subtract points from all of the participants' point totals, add new feature events to the forum, continuously update predicted outcomes and probabilities of future events, and otherwise modify forum parameters so that information contained within the forum related to the future events tracks current understanding of the future events and, more importantly, in order to maintain a high level of interest in the forum of current participants and potential participants. At the conclusion of operation of the forum, upon resolution of a culminating event or at some pre-determined, arbitrary point in time, users having the largest cumulative point totals may be declared winners and may be presented with various types of prizes, public recognition, or other rewards. In addition, incremental rewards may be offered for fixed intervals during operation of the forum.

The following four examples illustrate calculation of point outcomes based on various play submission scenarios. The examples also illustrate various types of forums.

EXAMPLE 1

This example relates to a forum defined by the football games played in a professional football sports league. The forum has 1,000 participants. Assume, for the sake of this example, that each participant submits a prediction, or straight play, on the winner of the championship game of the football season 20 weeks prior to the playing of that championship game. Each participant, in this example, submits his or her prediction with a confidence of 1 point. One method of assigning probabilities to outcomes of an event is to divide the confidence, expressed in risked points, for each possible outcome by the total number of points risked. If, for example, 100 of the 1,000 players predict Team Y to win the championship, then the probability of Team Y winning the championship may be estimated to be 100 divided by 1,000, in the present case, or 1/10. Thus, the reciprocal probability is 10. If Team Y ends up winning the championship game by 15 points over Team Y's opponent, then the point outcome for each player that submitted a straight play predicting that Team Y would be the winner of the championship game can be calculated as:

$$\text{point outcome}=\text{confidence}_p*\text{reciprocal probability}_p*\text{degree of win}_p*\text{time to resolution}_p=1*10*15*20=3000$$

Thus, for each player that submitted a straight play 20 weeks prior to the championship game predicting that Team Y will win the championship game with the confidence of 1, 3,000 points are added to the participant's point total.

EXAMPLE 2

The form of this example relates to three candidates X, Y, and Z running for a Senate seat. There are 1,000 participants in the forum. The next future event in the election is an upcoming debate, and predictions, or plays, can be submitted by the participants as to the outcome of public opinion polls following the debate. For example, a player may submit a prediction that candidate X's approval rating will increase by 3% as a result of the debate. Assuming that all 1,000 participants submit predictions, probabilities of the various outcomes arising from resolution of the event can be calculated based on the reciprocal of the ratios of the number of players favoring a particular candidate divided by the total number of plays submitted, very much like in the previous example based on football games. In this example, 400 players favor candidate X, 400 players favor candidate Y, and 200 players favor candidate Z. Thus, the reciprocal probabilities for candidate X, Y, Z are 2.5, 2.5, and 5, respectively. In this forum, the game master has decided the time to resolution axis will have four increments: (1) the time period extending from the end of the debate back in time to ½ hour before the end of the debate; (2) the time period extending from ½ hour prior to the end of the debate back to ½ hour after the start of the debate; (3) the time period extending from ½ hour after the start of the debate back to the start of the debate; and (4) the time extending from the start of the debate back to the beginning of operation of the forum. These four time intervals are associated with point multipliers of 1, 2, 3, and 4, respectively. Assume that player A watches the debate and, 29 minutes through the debate, player A thinks that Candidate X is the clear winner. Player A thus submits, during the time interval associated with a point multiplier of 3, a play predicting that candidate X will win the debate. If Candidate X's poll numbers jump 3% following the debate, player A's point outcome is calculated as follows:

$$\text{point outcome}=\text{confidence}_p*\text{reciprocal probability}_p*\text{degree of win}_p*\text{time to resolution}_p=1*2.5*3*3=23.5$$

Player B also intends to watch the debate, but is convinced that Candidate Z will win even before the debate starts. Thus, player B submits a straight play, or prediction of Candidate Z's victory prior to the start of the debate. Unfortunately, Candidate Z's approval rating falls by 4% after the debate. Player B's point outcome can then be calculated as follows:

$$\text{point outcome}=\text{confidence}_p*\text{reciprocal probability}_p*\text{degree of winp} * \text{time to resolution}_p=\text{confidence}_p*5*-3*4=-60\ \text{confidence}_p$$

EXAMPLE 3

The form in example 3 relates to a three-week season of football and the following championship game. Prior to the first game, player A chooses Team X to win the championship game and submits an aggregation play based on 10% of player A's balance. Initially, player A has a balance of 10 points, so the confidence level for the initial aggregation play is 10% of 10, or 1. Assume that the initial reciprocal probability associated with prediction of X winning the championship game is 5. The "time to resolution" parameter for the aggregation play is 4. With the remaining 9 points in player A's balance, player A submits additional plays and, following the first game of the season, player A has a balance of 92 points. The aggregation play is automatically reissued at a fixed interval, for example prior to each successive week of games in the season and prior to the championship game, as predetermined by a game master. Thus, prior to the second game of the season, the aggregation play is resubmitted with the confidence level of 10% of player A's current balance, calculated as 10% of 92 points, or 9 points. In this example, Team X wins its first game of the season, and the probability of X winning the Superbowl has thus increased, decreasing the reciprocal probability. However, the reciprocal probability for an aggregation play is fixed at the time of the initial submission of the aggregation play, so that, when the aggregation play is resubmitted prior to the second game of the season, the reciprocal probability remains at 5. If player A's point total rises to 212 following the second game of the season, 10% of this point total, or 21 points, is the confidence level, or risk, associated with the resubmission of the aggregation play prior to the third game of the season. If player A's point total rises to 789 points following the third game of the season, 10% of that point total, or 78 points, is automatically risked in the submission of the aggregation play prior to the championship game. Assuming that Team X wins the championship game by 7 points, player A's point outcome for the aggregation play may be calculated as follows:

$$\text{point outcome}=\text{point outcome}_{game\ 1}+\text{point outcome}_{game\ 2}+\text{point outcome}_{game\ 3}+\text{point outcome}_{game\ 4}$$

$$\text{point outcome}_{game\ 1}=\text{confidence}_p*\text{reciprocal probability}_p*\text{degree of win}_p*\text{time to resolution}_p=1*5*7*4=140$$

$$\text{point outcome}_{game\ 2}=\text{confidence}_p*\text{reciprocal probability}_p*\text{degree of win}_p*\text{time to resolution}_p=9*5*7*3=945$$

$$\text{point outcome}_{game\ 3}=\text{confidence}_p*\text{reciprocal probability}_p*\text{degree of win}_p*\text{time to resolution}_p=21*5*7*2=1,470$$

$$\text{point outcome}_{game\ 4}=\text{confidence}_p*\text{reciprocal probability}_p*\text{degree of win}_p*\text{time to resolution}_p=78*5*7*1=2,730$$

$$\text{point outcome}=140+945+1,470+2,730=5,285$$

EXAMPLE 3

This paragraph relates back to the forum of example 1, above. Prior to the second game of the season, player A decides to place a combination play related to player A's sanguine feelings towards Team X. The combination play is composed of the following component plays: (1) Team X wins the second game of the season; (2) Team X's quarterback throws more than his average of 182 yards per game; and (3) Team X's running back gains more than his average of 112 yards per game. If, during the second game of the season, Team X wins by two points, and the remaining score parameters have the values shown below, in Table 3:

TABLE 3

| component | time to resolution | degree of win | reciprocal probability |
|---|---|---|---|
| Team X wins | 3 | 2 | 4 |
| Quaterback exceeds average | 1 | 15 | 1 |
| Running back exceeds average | 1 | 23 | 1 |

then the point outcome for the combination play is determined as follows:

$$\text{point outcome}_{component\ 1}=\text{confidence}*3*2*4=24*\text{confidence}$$

$$\text{point outcome}_{component\ n}=\text{point outcome}_{component\ n-1}*\text{time to resolution}_{component\ n}*\text{degree of win}_{component\ n}*\text{reciprocal probability}_{component\ n}$$

$$\text{point outcome}_{component\ 2}=24*1*15*1=360$$

$$\text{point outcome}_{component\ 3}=360*1*23*1=8{,}280$$

Thus, combination plays can produce dramatically high rewards when all the component predictions within the combination play prove to be accurate

Implementation

A forum for competitive speculation may be computationally represented and managed via a set of relational database tables. The real time operation of a forum for competitive speculation may be implemented via an event loop running on an Internet server that fields and handles various types of interactive events arriving at the server as a result of interaction with the forum by participants as well as interaction with the forum by forum managers or game masters. In this subsection, a set of relational tables, accompanied with the SQL-like definitions of those tables, that computationally represent a forum defined with respect to two presidential debates followed by a presidential election are first provided.

Then, an event loop is presented to illustrate implementation of forum management. Finally, representative SQL-like statements are provided to illustrate implementation of the event handling routines included in the event loop.

Many of the basic parameters of a forum are stored in the following forum table:

TABLE 4

Forum Table (Part 1)

| ID | Title | Start Event | End Event | Start Date | End Date | Points to Start | Points Max Per Day | Max Combo Entries |
|---|---|---|---|---|---|---|---|---|
| 1 | Presidential Election - 2000 | First Debate | Election | 9/15/2000 | 11/7/2000 | 1000 | 1000 | 3 |

TABLE 5

Forum Table (Part 2)

| Max Points Per Combo | Max Combo Points Per Week | Max Combo Points YTD | Combo Base Percent | Max Base Percent | Max Event Percent | Max Combo Percent | Aggregation Unit | Max Aggregation Percent |
|---|---|---|---|---|---|---|---|---|
| 100 | 100 | 100 | 100 | 500 | 500 | 300 | Month | 10 |

```
CREATE TABLE ForumTable (ID integer,
Title                   varchar(128),
StartEvent              varchar(128),
EndEvent                varchar(128),
StartDate               date,
EndDate                 date,
PointsToStart           integer,
PointsMaxPerDay         integer,
MaxComboEntries         integer,
MaxPointsPerCombo       integer,
MaxComboPointsPerWeek   integer,
MaxComboPointsYTD       integer,
ComboBasePercent        integer,
MaxBasePercent          integer,
MaxEventPercent         integer,
MaxComboPercent         integer,
AggregationUnit         varchar(20),
MaxAggregationPercent   integer)
```

The forum table contains the following columns, or fields: (1) "ID," a unique integer identifier of a forum; (2) "Title"

a character-string representation of the title, or name, of the forum; (3) "StartEvent," a character-string of the first future event in the set of events that define the forum that will occur; (4)"EndEvent," a character-string representation of the final culminating event of the forum; (5) "StrartDate," the date that the starting event will occur; (6) "EndDate," the date upon which the final event will occur; (7) "PointsToStart," an integer representation of the number of points allocated to new participants upon successful sign-up; (8) "PointMaxPerDay," the maximum number of points available to a participant each day for risking plays; (9) "MaxComboEntries," the maximum number of combination plays that a participant may make during the course of operation of the forum; (10) "MaxPointsPerCombo," the maximum number of points available to a participant to risk in any particular combination play; (11) "MaxComboPointsPerWeek," the maximum number of points that a participant may risk in combo plays during the course of the week; (12) "MaxComboPointsYTD," the maximum number of points that a player may risk in combination plays during the course of a game; (13) "ComboBasePercent," a basis for computing a point score; (14) "MaxBasePercent," maximum multiplier for staright plays; (15) "MaxEventPercent," maximum multiplier for a future event; (16) "MaxComboPercent," maximum multiplier for combination palys; (17) "AggregationUnit," the time interval between automatic submissions of an aggregation play; and (18) "MaxAggregationPercent," the maximum percent of current point holdings that a participant may risk on a given aggregation play. Note that many different forums may be concurrently operational, and for each operational forum, there will be a single entry in the forum table. A representative entry related to the above-mentioned presidential election forum is included in Tables 4 and 5.

The GameInfoTable relational table, provided below, includes information about the various events within the set of events that define a particular forum. Continuing with the election example, theGameInfoTable relational table, provided below as Table 6, includes entries that define the first debate, the second debate, and the general election events included in the presidential election forum:

TABLE 6

GameInfoTable

| ID | ForumID | GameType | Event | EventDate |
|---|---|---|---|---|
| 1 | 1 | election | First Debate | 9/15/2000 |
| 2 | 1 | election | Second Debate | 10/15/2000 |
| 3 | 1 | election | Election Day | 11/7/2000 |

TABLE 6-continued

GameInfoTable

| ID | ForumID | GameType | Event | EventDate |
|---|---|---|---|---|

```
CREATE TABLE GameInfoTable   (ID          integer,
                              ForumID     integer,
                              GameType    varchar(128),
                              Event       varchar(128),
                              EventDate   date)
```

The game input table includes the following columns, or fields: (1) "ID," a unique integer identifier of the event; (2) "ForumID," the unique identifier of the forum to which the event belongs; (3) "GameType," a character-string representation of the type of forum to which the event belongs; (4) "Event," a character-string representation of the name of the event; and (5) "Event Date," the date on which the event will occur.

Information about the predicted natural outcomes of events is stored in the relational table "GameActivityTable," provided below:

TABLE 7

GameActivityTable

| ID | GameInfoID | CandidateName | Predicted-Outcome | Actual-Outcome |
|---|---|---|---|---|
| 1 | 1 | Dan Quayle | 27 | 30 |
| 2 | 1 | Al Gore | 31 | 30 |

```
CREATE TABLE GameActivityTable   (ID               integer,
                                  GameInfoID       integer,
                                  Candidate Name   varchar(128),
                                  Predicted Outcome integer,
                                  ActualOutcome    inteher);
```

The game activity table relational table includes the following columns, or fields: (1) "ID," the unique identifier for the entry in the game activity table; (2) "GameInfoID," the unique identifier of the event, as included in the ID field of the GameInfoTable relational table; (3) "Candidate Name," a character-string representation of the name of a candidate in the presidential election; (4) "PredictedOutcome," a numeric representation of the predicted outcome of an event, such as the predicted approval rating for a candidate following a debate; and (5) "ActualOutcome," a numeric representation of the actual outcome of the event.

The relational table "PlayTable," provided below as Table 8, stores information related to plays submitted by participants:

TABLE 8

PlayTable

| ID | Game-Activity-ID | Customer-ID | Play On | Play Type | Amount | PlayStatus | PlayDate | Degree-of Win |
|---|---|---|---|---|---|---|---|---|
| 1 | 1 | 1 | win | straight | 10 | not played | 9/1/2000 | $3_2$ |
| 2 | 1 | | win | combo component | | not played | 9/1/2000 | $3_2$ |

TABLE 8-continued

PlayTable

| ID | Game-Activity-ID | Customer-ID | Play On | Play Type | Amount | PlayStatus | PlayDate | Degree-of Win |
|---|---|---|---|---|---|---|---|---|
| 3 | 2 | | win | combo component | | lose | 9/1/2000 | $-1_2$ |
| 4 | 1 | 1 | lose | aggregation | 5% | not played | 9/1/2000 | |

```
CREATE TABLE PlayTable (ID   integer,
GameActivityID               integer,
CustomerID                   integer,
PlayOn                       varchar(128),
PlayType                     varchar(128),
Amount                       integer,
PlayStatus                   varchar(128),
PlayDate                     date,
DegreeOfWin                  integer)
```

The relational table "PlayTable" contains the following columns, or fields: (1) "ID," a unique numerical identifier for the play; (2) "GameActivityID," a unique identifier of an entry in the GameActivityTable relational table that represents information about the event related to the play; (3) "CustomerID," a unique identifier for the participant that submitted the play; (4) "PlayOn," a character-string representation of the prediction represented by the play; (5) "PlayType," a character-string representation of the type of play, where the type of plays may include straight plays, component straight plays of combination plays, and aggregation plays (note that combination plays are entered into a distinct additional relational table to be described below); (6) "Amount," the number of points risked in the play, or the confidence of the prediction represented by the play; (7) "PlayStatus," a character-string representation of the current status of this play, where the current status may include "not played," "win," and "lose;" (8) "PlayDate," the date on which the play was submitted; and (9) "DegreeofWin," the numeric representation of the amount by which the result exceeds of falls short of a predicted outcome. A number of entries are included in Table 8 as representative examples of plays submitted for the presidential election forum.

The relational table "ComboTable," provided below, includes information concerning combination plays submitted by participants:

TABLE 9

ComboTable

| ID | Customer ID | PlayTable ID1 | PlayTable ID2 | PlayTable ID3 | Amount | PlayStatus |
|---|---|---|---|---|---|---|
| 1 | 1 | 2 | 3 | | 10 | not played |

```
CREATE TABLE ComboTable      (ID            integer,
                             CustomerID     nteger,
```

TABLE 9-continued

ComboTable

| ID | Customer ID | PlayTable ID1 | PlayTable ID2 | PlayTable ID3 | Amount | PlayStatus |
|---|---|---|---|---|---|---|

```
PlayTableID1     integer,
PlayTableID2     integer,
PlayTableID3     integer,
Amount           integer,
PlayStatus       varchar(128))
```

The relational table "ComboTable" contains the following columns, or fields: (1) "ID," a unique identifier for a combination play; (2) "CustomerID," a unique numerical identification of the participant that submitted the combination play; (3) a number of fields "PlayTableID1," "PlayTableID2," and "PlayTableID3" that contain numerical identifiers of PlayTable relational table entries that describe the component plays included within the combination play, where the number of such fields is the maximum number of component plays that may be included within a combination play; (4) "Amount," the confidence of the prediction represented by the combination play, or the number of points risked by the participant in submitting the combination play; and (5) "PlayStatus," a character-string representation of the current status of the combination play, where the current status may include "win," "lose," "not played," and "push." The status "push" indicates that the combination play neither succeeded nor failed, and thus that the participant who submitted the combination play received neither a reward nor suffered a penalty upon the resolution of the combination play.

The relational table "GameTransactionTable," provided below as Table 10, contains an entry for each transaction carried out during the course of operation of the forum:

TABLE 10

Game Transaction Table

| ID | CustomerID | Credit | Debit | ForumID | TransactionType | PlayType | PlayID | TransactionDate |
|---|---|---|---|---|---|---|---|---|
| 0 | 1 | 1000 | 0 | 1 | start-up | | | 9/1/2000 |
| 1 | 1 | | 10 | 1 | play | straight | 1 | 9/1/2000 |
| 2 | 1 | | 10 | 1 | play | combo | 1 | 9/1/2000 |
| 3 | 1 | | 5 | 1 | play | aggregation | 4 | 9/1/2000 |

TABLE 10-continued

Game Transaction Table

| ID | CustomerID | Credit | Debit | ForumID | TransactionType | PlayType | PlayID | TransactionDate |
|---|---|---|---|---|---|---|---|---|
| 4 | 1 | 60 | | 1 | win resolution | straight | 1 | 9/15/2000 |
| 5 | 1 | 0 | 0 | 1 | close resolution | combo | 1 | 9/15/2000 |
| 6 | 1 | 0 | 5 | 1 | play | aggregation | 4 | 9/15/2000 |

```
CREATE TABLE GameTransactionTable (ID    integer,
CustomerID                               integer,
Credit                                   integer,
Debit                                    integer,
ForumID                                  integer,
TransactionType                          varchar(128),
PlayType                                 varchar(128),
PlayID                                   integer,
TransactionDate                          date)
```

The game transaction table includes the following fields, or columns: (1) "ID," a numerical identifier of the transaction; (2) "CustomerID," a unique identifier of the participant with which the transaction is associated; (3) "Credit," the point credit accruing to the participant as the result of a transaction, if any; (4) "Debit," the debit suffered by the participant as a result of the transaction, if any; (5) "ForumID," a unique identifier of the forum with which the transaction is associated; (6) "TransactionType," a character-string representation of the type of transaction, where transaction types include "start-up," "play," "win resolution," "lose resolution," and "close resolution;" (7) "PlayType," a character representation of the type of play associated with the transaction; (8) "PlayID," a numerical identification of an entry in the relational tables "PlayTable" and "ComboTable" associated with the transaction; and (9) "TransactionDate," the date that the transaction occurred. Note that the relational tables presented in this section refer to the presidential election forum, and that different types of relational tables may be necessary to support other types of forums. For example, in forums having fast-paced events, such as forums defined by stock market behavior, both dates and times may be necessary for transactions, plays, and other events. In Table 10, representative data is displayed related to the presidential election forum.

Finally, the relational table "CustomerTable," provided below as Table 11, contains information related to participants:

TABLE 11

CustomerTable

| ID | Forum ID | UserName | First-Name | LastName | Password | LogonState |
|---|---|---|---|---|---|---|
| 1 | 1 | frazzled | John | Dazzle | the dazzler | FALSE |

```
CREATE TABLE CustomerTable (ID    integer,
ForumID,                          integer,
UserName                          varchar(128),
FirstName                         varchar(128),
LastName                          varchar(128),
Password                          varchar(128),
LogonState                        varchar(128))
```

The relational table "CustomerTable" includes the following columns, or fields: (1) "ID," a unique numerical identifier of the customer; (2) "ForumID," the unique identifier of an operating forum; (3) "UserName," a character-string representation of a user name associated with the participant; (4) "FirstName," the first name of the participant; (5) "LastName," the last name of the participant; (6) "Password," a password unique to the participant which the participant may supply upon logon in order to submit plays or view forum status; and (7) "LogonState," a character-string representation of the logon state of the participant. Note that the ID and ForumID fields together form a unique key identifying a particular participant's participation in a particular forum.

Using the above-described tables, operation of competitive speculation forums may be implemented as an event loop running on a server computer. Events that occur during operation of the forum are handled by event handler routines called from the event loop, resulting in return of information to participants and game masters, input of information into the above-described relational tables, and updates to the above-described relational tables that reflect changes in the state of the forum. The following pseudocode implements, at a high level, an event loop that carries out concurrent operation of a number of competitive speculation forums:

```
GameServer__Event__Loop ( )
{
  while (true)
  {
    event=GetNextEvent( );
    switch (event)
    {
      case SetupGame
        DoSetupGame( );
         break;
       case ModifyGame
         DoModifyGame( );
         break
       case SignUpUser
         DoSignUpUser( );
         break
       case Logon
         DoLogon( );
         break;
       case PlaceStraightPlay
         DoPlaceStraightPlay( );
         break;
       case ComboPlay
         DoComboPlay( );
         break;
       case AggregationPlay
         DoAggregationPlay( );
         break;
       case UpdateGameTable
         DoUpdateGameTable( );
         break;
       case ShowGameInformation
         DoShowGameInformation( );
         break;
```

-continued

```
35        case FinalGameResolution
36            DoFinalGameResolution( );
37            break;
38     ]
39   }
40 }
```

The event loop comprises a continuously repeating while-loop of lines 2–39. On line 5, the next event is received from a participant or game master at the server computer in which the event loop is running. This event, in one implementation of the present invention, is a message received by the server computer via the Internet. In current embodiments of the present invention, the event is generated by a participant or game master using the graphical user interface running on a remote PC. The graphic user interface exchanges information with the server computer. The various displays generated by the graphical user interface are specified in hypertext markup language ("HTML") files exchanged between the server computer and the remote PC. The graphical user interface allows remote users to login in to particular ongoing forums, view graphical representations of the current state of the forum, submit transactions to the forum, including plays and, in the case of game master, submit various updates to the forum and manage operation of the forum.

In the switch statement comprising lines 6–38, an appropriate handler routine is called depending on the nature of the received event. The possible types of received events include: (1) "SetupGame," a game master-initiated event for instantiating a new forum; (2) "ModifyGame," a game master-initiated event for modifying the current state of instantiated forums, (3) "SignUpUser," a participant-initiated event corresponding to a sign-up request from a potential participant; (4) "Logon," a game master or participant-instantiated event that corresponds to a request to logon to an operating forum; (5) "PlaceStraightPlay," a participant-instantiated event corresponding to submission of a straight play; (6) "ComboPlay," a participant-instantiated event corresponding to submission of a combination play; (7) "AggregationPlay," a participant-instantiated event corresponding to submission of an aggregation play; (8) "UpdateGameTable," an automatically-generated event for updating the state of an event defining a forum, the event instantiated by monitoring routines that mine information from the Internet about events, that represents one possible method for tracking and updating events; (9) "ShowGameInformation," a game master or participant-instantiated event requesting current state information related to an operating forum; and (10) "FinalGameResolution," a game master-instantiated or automatically-generated event triggered by the occurrence of the final event that defines an operating forum that results in determination of one or more winners from among the participants in the forum. Each of the event handler routines called from the event loop, including event handler routines "DoSetupGame," "DoModifyGame," "DoSignUpUser," "DoLogon," "DoPlaceStraightPlay," "DoComboPlay," "DoAggregationPlay," "DoUpdateGameTable," "DoShowGameInformation," and "DoFinalGame Resolution," processes information received in the message corresponding to the event and generally modifies one or more entries in one or more of the above-described relational tables to implement an action or state change corresponding to the event. The vast majority of the table manipulation by event handler routines is accomplished through straightforward SQL insert and update commands that insert values into relational tables and modify values already residing in the relational database tables. For example, the handler routine "DoSignUpUser" may create an entry for a new participant via the following SQL-like statement:

Insert into CustomerTable (ID, ForumID, UserName, FirstName, LastName, Password, LogonState) Values (1, 1, "frazzled," "John," "Dazzle," "thedazzler," FALSE)

As another example, the handler routine "DoUpdateGameTable" may execute the following SQL-like statement when the results of a presidential debate are determined:

```
Update GameActivityTable
   Set ActualOutcome=30
   WHERE CandidateName='Dan Quayle'
   and GameInfoID=1
```

The event handler routine "DoSetUpGame" essentially enters a single row into the forum table (tables 4–5) and may enter associated rows into the tables "GameInfoTable," (Table 6) and the "GameActivityTable" (Table 7). The event handler routine "DoModifyGame" may modify the contents of the row in the forum table (Tables 4–5) corresponding to the forum associated with a received ModifyGame event and may update or add new rows into the GameInfoTable table (Table 6) and the GameActivityTable (Table 7). Thus, these two event handler routines serve to enter input data from game masters into the three tables that define the overall parameters of operating forums.

The event handler routine "DoSignUpUser" creates a new entry in the table Customer-fable (Table 11). The event handling routine "DoLogon" updates an entry in the table "CustomerTable" (Table 11) by changing the value of the field "LogonState" from FALSE to TRUE.

The event handler routine "DoPlaceStraightPlay" creates a new entry, or row, in both the table "PlayTable" (Table 8) and the table "GameTransactionTable" (Table 10) to reflect submission of a straight play. The event handler routine "DoAggregationPlay" also adds a single entry into each of the tables "PlayTable" and "GameTransactionTable." The event handler routine "DoComboPlay" adds a single entry into the relational table "ComboTable" to represent a combination play, adds a number of entries into the relational table "PlayTable" to represent the component plays of the combination play, and places a single row into the relational table "GameTransactionTable." The event handler routine "DoUpdateGameTable" may first update the field "ActualOutcome" in an entry in the relational table "GameActivityTable" to reflect resolution of an event, and then update the fields "PlayStatus" of both relational tables "PlayTable" and "ComboTable," according to the outcome determining formulas discussed above, to resolve individual plays made by participants.

The event handler routine "DoShowGameInformation" may extract information from any of the above-described tables in order to display a representation of the current state of the forum to requesting remote users. Generally, all fields in the above-described relational tables will be accessible to game masters, but only a subset of the data contained in the above-described tables will be available to any particular participant. If a participant wishes to see that participant's current point total, for example, the event handler routine "DoShowGameInformation" may execute the following SQL-like statement:

```
Select     SUM(credit) - Sum(debit)
from       GameTransactionTable
where      CustomerID = X and
           forumID = Y
```

where X is the numerical identifier of the requesting participant and Y is the numerical identifier of the forum onto which the participant has logged on. Finally, the event handler routine "DoFinalGameResolution" may select one or more winning participants via an SQL-like statement similar to the following SQL-like statement:

SELECT TOP 1 customerid, (SUM(credit)−SUM(debit)) AS winning

FROM GameTransactionTable

GROUP BY customerid

ORDER BY winning desc

This event handler routine "DoFinalGameResolution" may also conduct cleanup activities following selection of winners, including removing entries related to the forum in the above-described relational database tables.

Although the present invention has been described in terms of a particular embodiment, it is not intended that the invention be limited to this embodiment. Modifications within the spirit of the invention will be apparent to those skilled in the art. For example, competitive speculation forums can be implemented and managed using many different programming and data storage and organization techniques. Relational database implementations, file-based implementations, object-oriented implementations, and other data storage and management strategies can be used to organize and manage forums. Many different types of events can be handled, different types of data can be stored for different types of forums, and various types of access and security methodologies can be used to ensure privacy and security for participants. Different formulas for computing point outcomes of plays can be used, and different formulas and strategies for choosing winners can be employed.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. A method for conducting a competitive speculation forum, the method comprising:

initializing the competitive speculation forum, including defining the competitive speculation forum with a set of future events, associating with each future event the time that the future events will occur, an expected outcome of the future event, and probabilities for possible outcomes of the future event; and repeatedly receiving an event;

when the received event is a play submitted by a participant, recording the play, including a predicted outcome for one or more of the future events and a number of points representing a risk associated with the play;

when the received event corresponds to a resolution of a future event using an actual outcome of the future event, for each play submitted by each participant, calculating a point outcome for the play, the calculation based on a risk associated with the play, a length of a time between submission of the play and resolution of a future event with which the play is associated, a measure of the degree by which the actual outcome exceeds or falls short of an expected outcome associated with the future event, and a probability associated with the future event;

until a culminating future event from among the future events defining the competitive speculation forum is resolved.

2. The method of claim 1 wherein types of plays submitted by participants include:

a straight play, submitted one time and associated with a single future event;

an aggregation play submitted one time, associated with a single future event, and automatically resubmitted at fixed time intervals; and a combination play, submitted one time and associated with a number of component straight plays each associated with a single future event.

3. The method of claim 2 wherein probabilities for possible outcomes of a future event are adjusted over time to reflect outcomes of preceding events.

4. The method of claim 3 wherein a probability associated with a future event at the time an aggregation play is submitted is associated with the aggregation play and is used for all resubmissions of the aggregation play.

5. The method of claim 4 wherein the point outcome for a combination play is the product of the point outcomes of all component straight plays associated with the combination play.

6. A competitive event prediction forum in which participants predict the outcomes of future events, the competitive event prediction forum comprising:

at least one server computer;

data accessible to the server computer that defines the competitive event prediction forum as a set of future events; and a server program running on the server computer that receives from a participant a prediction of the outcome of a future event in the set of future events along with a number of points that the participant wishes to risk on the prediction, stores indications of the received prediction and the number of points that the participant wishes to risk on the prediction, after the event occurs, resolves the received prediction into a point total, resolution of the received prediction based on the number of points that the participant wishes to risk on the prediction, a degree to which outcome of the event exceeds the received prediction or falls short of the received prediction, a reciprocal of an estimated probability for the event, and the amount of time between reception by the server program of the received prediction and the occurrence of the event, and adds the point total to a cumulative point total maintained by the server program for the participant.

7. The competitive event prediction forum of claim 6 in which a participant may enter a straight prediction based on the occurrence of a single future event, a combination prediction based on the outcomes of more than one future event, and an aggregation prediction that is repeatedly and automatically re-submitted at regular time intervals.

* * * * *